Jan. 23, 1923.
R. L. FORD.
SUPERPOSED HOPPER FOR PLANTERS.
ORIGINAL FILED MAY 6, 1921.
1,443,174
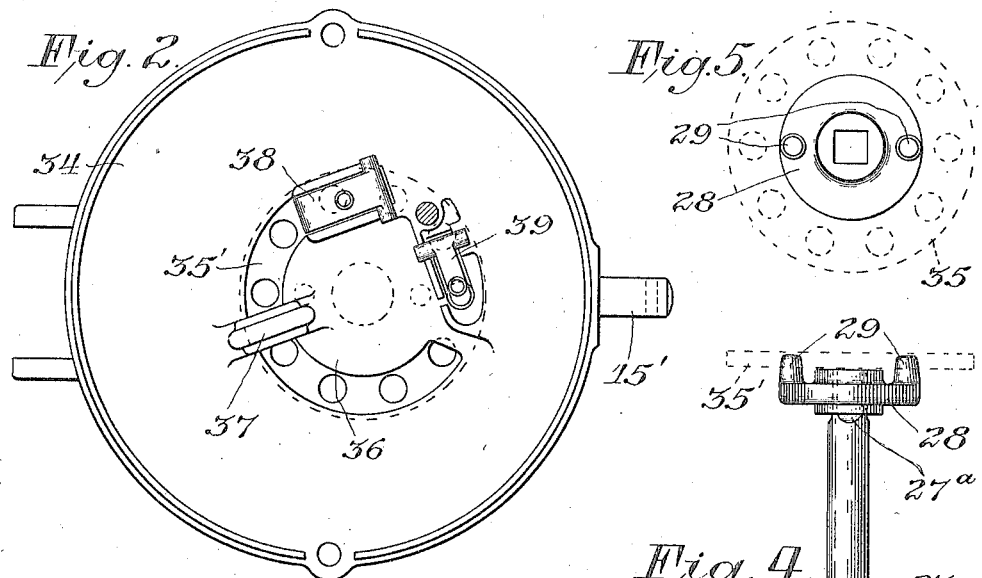
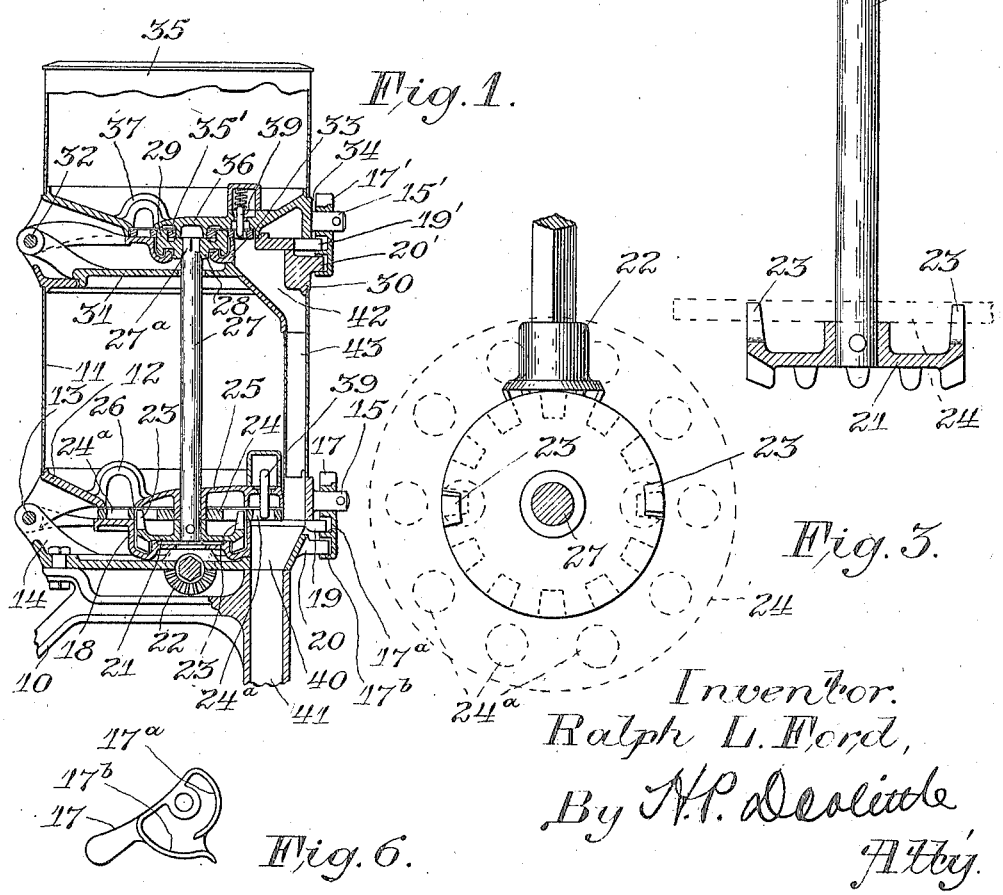
Inventor.
Ralph L. Ford,
By H. P. Doolittle
Atty.

Patented Jan. 23, 1923.

1,443,174

UNITED STATES PATENT OFFICE.

RALPH L. FORD, OF CHICAGO, ILLINOIS, ASSIGNOR TO INTERNATIONAL HARVESTER COMPANY, A CORPORATION OF NEW JERSEY.

SUPERPOSED HOPPER FOR PLANTERS.

Application filed May 6, 1921, Serial No. 467,294. Renewed July 11, 1922. Serial No. 574,287.

*To all whom it may concern:*

Be it known that I, RALPH L. FORD, a citizen of the United States, residing at Chicago, in the county of Cook and State of Illinois, have invented certain new and useful Improvements in Superposed Hoppers for Planters, of which the following is a full, clear, and exact specification.

My invention relates to seed dispensing mechanism for planters and particularly to mechanism for simultaneously dispensing different seeds, such as peas or beans and corn, which is often desirable to plant at the same time, and the objects of my invention are to simplify the construction of the double hopper and dispensing mechanisms required and to so arrange the hoppers as to occupy a minimum amount of space, while making each hopper and its contained mechanism readily accessible.

I attain these objects by providing a duplex structure composed of axially aligned superposed hoppers each provided with dispensing means driven in unison by a central vertical shaft, the upper hopper having a discharge outlet communicating with one for the lower hopper, and the upper hopper being hinged to the top or closure of the lower hopper in such a way as to permit it to be swung away in a manner to afford access to the lower hopper.

With these main and other incidental objects in view, my invention consists of the organization and details of construction hereinafter described and claimed.

Referring to the drawings:

Fig. 1 is a central vertical section through the duplex hoppers and a portion of a planter boot.

Fig. 2 is a plan view on an enlarged scale showing the dispensing mechanism of the upper hopper.

Fig. 3 is an enlarged detail view of the drive for the lower hopper.

Fig. 4 is an enlarged detail view of the drive shaft between the upper and lower hoppers.

Fig. 5 is a detail plan view of the drive for the seed dispensing plate in the upper hopper.

Fig. 6 is a detail view of the latching device for the hoppers.

In the present instance, my invention is shown as supported on a corn planter boot shown in section at 10, Figure 1. The lower hopper 11 is provided with a base casting 12 which is hinged at 13 to a base plate 14 bolted to the planter boot. The base 12 is provided with a stud 15 on which a cam latch 17 is pivotally mounted. Between the bottom plate 12 and the base plate 14 a seed plate supporting member 18 is positioned and also has a pivotal connection with the bottom plate 12 at 13. This member 18 is formed with a projecting stud 19 and a stud 20 extending from the planter boot is provided just below it. The latch member 17 is formed with opposite cam tracks $17^a$ and $17^b$ and the arrangement is such that a throw of the latch 17 in one direction will engage stud 19 and lock the seed plate supporting member to the hopper, but permit both to be tilted on pivot 13, while a swing of the latch in the opposite direction will engage the stud 20 and lock the hopper to its support, which in this case is the planter boot. The latch shown forms the subject matter of my co-pending application, Serial No. 467,293, filed May 6, 1921. The member 18 is formed to provide a bearing surface to support a gear wheel 21 which is in mesh with the pinion 22 on the drive shaft of the planter. The gear 21 is provided with opposite upwardly extending studs 23 which interlock with apertures in the seed dropping plate 24. The bottom plate of the hopper has a central cover plate 25 which is connected with the outer or ring portion of the bottom casting 12 by an arched radial member 26, this cover plate being shaped to extend over the central portion of the seed dispensing plate 24, leaving only the seed cells $24^a$ near the outer edge of the plate exposed. The gear 21 is fixed to a vertically extending cylindrical shaft 27 which passes through cover plate 25 and has its upper end squared as at $27^a$ to engage in a corresponding socket in a driving member 28 provided with upwardly extending lugs 29, the purpose of which will be hereinafter described. The bottom hopper is provided with a closure or top 30, the central portion of which consists of a portion 31 which is hinged at 32 to a pivot on the cover 30, the shaft 27 passing upwardly through an opening in this hinged portion. Also hinged to the pivot 32 is an intermediate plate supporting member 33 and a bottom plate 34 for the upper hopper 35. The drive member 28 rests on bearings formed in the intermediate plate 33 which also supports the seed dispensing plate 35' which is provided with apertures which interlock with the lugs 29 of the driving member 28. The bottom plate 34 of the upper hopper has a central cover plate 36 connected by an arched radial member 37 with the outer portion of the bottom plate in the same manner as in the lower hopper. The bottom plate 34 is provided with a stud 15' carrying a latch 17' which engages studs 19' and 20' in the same manner as heretofore described in connection with the latch for the lower hopper. Each seed plate is provided with the usual cut-off 38 and ejector or knockout 39 (Fig. 2), which in connection with their respective seed plates constitute the seed selecting and dispensing mechanism. The dispensing mechanism of the lower hopper discharges into a throat 40 leading to chute 41, and that for the upper hopper discharges into a throat 42 which connects with the lower throat by means of a chute 43.

In operation, power is received from the drive shaft and pinion 22 which drives the vertical shaft 27 through gear 21, this shaft through its interlocking connections with the upper and lower seed plates driving both the dispensing mechanisms in unison. As the plates rotate, seed is deposited in the seed openings of the plates, the excess seed is swept off by the cut-offs and as the seed cells come from the discharge throats the spring pressed ejectors 39 discharge the seed into the outlets. With the hopper construction described it will be seen that the lower hopper is readily accessible by turning latch 17' in a direction to release it from lug 20', which then permits the upper hopper, together with supporting member 33, to be swung aside, lifting with it drive member 28 which is freely detachable from shaft 27. With hopper 35 out of the way the hinged portion 31 has only to be raised to open the lower hopper. It will be understood also that if access to the driving mechanism of the lower hopper is desired, both hoppers can be swung aside on the pivot 13 by releasing latch 17 in the same manner as above described.

From the foregoing it will be seen that I have provided a simple and convenient structure, occupying little space, and one in which either hopper can be opened without disturbing the other. While I have disclosed one specific embodiment of my invention, it will be understood that variations therefrom, particularly in the character of dispensing mechanism employed, are contemplated within the scope of the following claims.

I claim as my invention:

1. A duplex dispensing device for planters, comprising a lower hopper, an upper hopper provided with a base hinged on the upper portion of the lower hopper, seed dispensing mechanism in each hopper, means for driving both dispensing mechanisms in unison, and a discharge chute communicating with both hoppers.

2. A duplex dispensing device for planters, comprising a lower hopper, a closure thereon including a hinged portion, an upper hopper provided with a base hinged on the same pivot as said portion and supported on said closure, dispensing mechanism in each hopper, a common driving element for both dispensing mechanisms, and a discharge chute communicating with both hoppers.

3. A duplex dispensing device for planters, comprising a lower hopper, a closure thereon including a hinged portion, an upper hopper provided with a base hinged on the same pivot as said portion and supported on said closure, dispensing mechanism in said hopper, an upright drive shaft extending through the closure of the lower hopper and connected to both dispensing mechanisms, and a discharge chute communicating with both hoppers.

4. The combination of axially aligned superposed hoppers, dispensing mechanism in each hopper comprising a horizontally positioned rotatable plate, a discharge throat in cooperative relation with each dispensing mechanism, a drive shaft extending vertically within the hoppers and provided with driving elements in interlocking relation with the plates, and a chute connecting the upper and lower discharge throats.

5. The combination of superposed hoppers, dispensing mechanism in each hopper comprising a horizontally positioned rotatable plate, a discharge throat in cooperative relation with each dispensing mechanism, a vertically extending drive shaft provided with driving elements in interlocking relation with the plates, and a chute connecting the upper and lower discharge throats.

6. The combination of superposed hoppers, dispensing mechanism in each hopper, a discharge chute in cooperative relation with each dispensing mechanism, and means for driving both dispensing mechanisms.

7. A duplex dispensing device for planters comprising a lower hopper, an upper hopper having a base hinged on the lower hopper, dispensing mechanism in each hopper, a drive shaft extending upwardly in the lower hopper, a driving connection between said shaft and the dispensing mechanism in the lower hopper, and a drive element formed with a socket receiving the upper end of said shaft and with drive means interlocking with the dispensing mechanism in the upper hopper.

8. A duplex dispensing device for planters, comprising a lower hopper, a hinged closure thereon, an upper hopper provided with a base hinged to said closure, dispensing mechanism in each hopper, a drive shaft extending upwardly in the lower hopper, a driving connection between said shaft and the dispensing mechanism in the lower hopper, and a drive element supported for rotation on said closure and formed with a socket receiving the upper end of the drive shaft and with drive means interlocking with the dispensing mechanism in the upper hopper.

9. The combination of a support, a hopper hinged to the support, a second hopper hingedly mounted on the first hopper, dispensing mechanism in each hopper, and means for driving the dispensing mechanisms.

In testimony whereof I affix my signature.

RALPH L. FORD.